(12) United States Patent
Watanabe et al.

(10) Patent No.: US 9,125,226 B2
(45) Date of Patent: Sep. 1, 2015

(54) WIRELESS COMMUNICATION SYSTEM, NEIGHBOR CELL LIST OPTIMIZATION SYSTEM, BASE STATION, AND NEIGHBOR CELL LIST UPDATE METHOD

(75) Inventors: Yoshinori Watanabe, Tokyo (JP); Yasuhiko Matsunaga, Tokyo (JP); Kojiro Hamabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 62 days.

(21) Appl. No.: 13/813,710

(22) PCT Filed: Aug. 3, 2011

(86) PCT No.: PCT/JP2011/067766
§ 371 (c)(1),
(2), (4) Date: Feb. 1, 2013

(87) PCT Pub. No.: WO2012/032886
PCT Pub. Date: Mar. 15, 2012

(65) Prior Publication Data
US 2013/0137473 A1    May 30, 2013

(30) Foreign Application Priority Data

Sep. 8, 2010    (JP) ................................ 2010-201013

(51) Int. Cl.
*H04W 40/00*    (2009.01)
*H04W 88/02*    (2009.01)
(Continued)

(52) U.S. Cl.
CPC .............. *H04W 88/02* (2013.01); *H04W 36/00* (2013.01); *H04W 16/18* (2013.01); *H04W 24/10* (2013.01)

(58) Field of Classification Search
CPC ...... H04W 16/18; H04W 24/10; H04W 36/00; H04W 88/02; H04W 36/0083; H04W 24/02; H04W 16/02; H04W 16/12; H04W 16/24
USPC .............. 455/436, 423, 424, 434, 435.1, 466, 455/422.1, 448, 449, 450, 446, 447, 453, 455/500, 512; 370/335, 370
See application file for complete search history.

(56) References Cited

U.S. PATENT DOCUMENTS 6,778,833 B1 *   8/2004   Fortuna .......................... 455/446
2003/0078043 A1   4/2003   Horwath et al.
(Continued)

FOREIGN PATENT DOCUMENTS

CN          1173895 A          5/2006
CN          101052195 A        10/2007
(Continued)

OTHER PUBLICATIONS

3GPP TS 36.331 V8.4.0, 3rd Generation Partnership Project; Technical Specification Group Radio Access Network; Evolved Universal Terrestrial Radio Access Network (E-UTRAN) Radio Resource Control (RRC); Protocol specification (Release 8), Dec. 2008, pp. 1-9.
(Continued)

*Primary Examiner* — Khai M Nguyen
(74) *Attorney, Agent, or Firm* — Sughrue Mion, PLLC

(57) ABSTRACT

The present invention is applicable to a wireless communication system provided with mobile terminals and base stations that manage cells to which the mobile terminals are connected. The wireless communication system of the present invention has a new cell detection unit that detects, from among neighbor cells which are adjacent to the cells to which the mobile terminals are connected, new cells that have newly started or whose operation has resumed or whose geographical range has changed, and a neighbor cell list generation unit which preferentially registers new cells that have been detected by the new cell detection unit in neighbor cell lists in which are registered neighbor cells that are candidates for handover destinations of the mobile terminals.

9 Claims, 11 Drawing Sheets

(51) Int. Cl.
*H04W 36/00* (2009.01)
*H04W 16/18* (2009.01)
*H04W 24/10* (2009.01)

(56) References Cited

U.S. PATENT DOCUMENTS

| | | | | |
|---|---|---|---|---|
| 2006/0121907 | A1* | 6/2006 | Mori et al. | 455/447 |
| 2008/0002328 | A1* | 1/2008 | Allain et al. | 361/306.1 |
| 2009/0047958 | A1* | 2/2009 | Rimhagen et al. | 455/436 |
| 2009/0280811 | A1* | 11/2009 | Kida et al. | 455/436 |
| 2010/0003998 | A1* | 1/2010 | Hamabe et al. | 455/452.1 |
| 2010/0195525 | A1* | 8/2010 | Eerolainen | 370/252 |
| 2010/0216455 | A1* | 8/2010 | Kazmi | 455/424 |

FOREIGN PATENT DOCUMENTS

| | | |
|---|---|---|
| CN | 101370262 A | 2/2009 |
| JP | 2003500952 A | 1/2003 |
| JP | 2006140829 A | 6/2006 |
| JP | 2006191625 A | 7/2006 |
| JP | 2008118404 A | 5/2008 |
| JP | 2008153963 A | 7/2008 |
| JP | 200989185 A | 4/2009 |
| WO | 0072618 A1 | 11/2000 |

OTHER PUBLICATIONS

David Soldani, et al., "Self-optimizing Neighbor Cell List for UTRA FDD Networks Using Detected Set Reporting", IEEE VTC, 2007, pp. 694-698.
Chinese Office Action date Feb. 4, 2015 issued in corresponding Chinese Patent Application No. 201180043292.1.

* cited by examiner

Management Table of Neighbor Cells of Cells X

| Neighbor cell | Number of reports | Cell type |
|---|---|---|
| #1 | $n_{X1}$ | Existing |
| #2 | $n_{X2}$ | Existing |
| ... | ... | ... |
| #M-1 | $n_{XM-1}$ | New |
| #M | $n_{XM}$ | New |

Totalized results ($M_X$)

Fig.11

Management Table of Neighbor Cells of Cells X

| Neighbor cel | Number of reports | Increase rate | Cell type |
|---|---|---|---|
| #1 | $n_{X1}$ |  | Existing |
| #2 | $n_{X2}$ |  | Existing |
| ... | ... | ... | ... |
| #M-1 | $n_{XM-1}$ | $r_{XM-1}$ | New |
| #M | $n_{XM}$ | $r_{XM}$ | New |

Management Table of Neighbor Cells of Cells X

| Neighbor cell | Number of reports (long interval) | Number of reports (short interval) | Cell type |
|---|---|---|---|
| #1 | $n_{X1}$ | $n'_{X1}$ | Existing |
| #2 | $n_{X2}$ | $n'_{X2}$ | Existing |
| ... | ... | ... | ... |
| #M-1 | $n_{XM-1}$ | $n'_{XM-1}$ | New |
| #M | $n_{XM}$ | $n'_{XM}$ | New |

WIRELESS COMMUNICATION SYSTEM, NEIGHBOR CELL LIST OPTIMIZATION SYSTEM, BASE STATION, AND NEIGHBOR CELL LIST UPDATE METHOD

CROSS REFERENCE TO RELATED APPLICATIONS

This application is a National Stage of International Application No. PCT/JP2011/067766, filed on Aug. 3, 2011, which claims priority from Japanese Patent Application No. 2010-201013, filed on Sep. 8, 2010, the contents of all of which are incorporated herein by reference in their entirety.

TECHNICAL FIELD

The present invention relates to a wireless communication system that updates a neighbor cell list, a neighbor cell list optimization system, a base station, and a neighbor cell list update method.

BACKGROUND ART

A wireless communication system typically has mobile terminals 10, wireless base stations 30, mobile communication core network 50, and network managing system 90, as shown in FIG. 1.

Each wireless base station 30 is each provided with wireless cell 35 as a range in which wireless links 20 are effective with mobile terminals 10 in the vicinity of its own station and manages this wireless cell 35.

Mobile terminals 10 connect with wireless cells 35 that are managed by wireless base stations 30 and carry out transmission and reception of the data of communication traffic and control traffic with wireless base stations 30.

Wireless base stations 30 further carry out transmission and reception of data with mobile communication core network 50 that is connected by way of wired links 40.

Mobile communication core network 50 includes an exchange station (not shown) and server device (not shown), is both connected by way of wired links 40 to wireless base stations 30 and connected by way of wired link 60 to outside network 70, and carries out transmission and reception of data with wireless base stations 30 and outside network 70.

Network managing system 90 is both connected to wireless base stations 30 by way of wired links 80 and connected to mobile communication core network 50 by way of wired link 81 and carries out monitoring of the quality of the wireless communication system, fault monitoring, and configuration management.

In a wireless communication system of this type, it is necessary that the wireless parameters of wireless base stations 30 be set appropriately to satisfy a required wireless quality in all service areas. Representative examples of wireless parameters include the total transmission power of each wireless cell, tilt angles in vertical/horizontal planes of wireless base station antennas, neighbor cell lists, and handover thresholds.

In the following description, it is assumed that a neighbor cell list of wireless cells managed by its own station is set as a wireless parameter in each wireless base station 30, and this neighbor cell list is next described.

In a wireless communication system, service is offered by a planar arrangement of wireless cells in all service areas. When moving from the connection destination wireless cell to another wireless cell, mobile terminal 10 carries out a process called handover of switching the connection destination wireless cell. This process is realized as follows. Mobile terminal 10 is first instructed in advance to measure the wireless quality of the connection destination wireless cell and wireless cells that are adjacent to this cell (neighbor cells), and if the wireless quality of the connection destination wireless cell deteriorates, to report the measurement information of the wireless quality of neighbor cells to wireless base station 30 that manages the connection destination wireless cell. Wireless base station 30 then determines the handover destination wireless cell at the point in time when a report is received from mobile terminal 10.

At this time, a method of limiting handover destination wireless cell candidates to only a portion of neighbor cells is typically used to reduce the load of mobile terminal 10 and effect rapid processing of the handover. The neighbor cell list is a list indicating, from among neighbor cells, those wireless cells that are candidates for handover destination of mobile terminal 10. A neighbor cell list is generated for each wireless cell by the communication provider and is communicated to mobile terminals 10 by way of a downlink line from wireless base station 30 that manages that wireless cell. Mobile terminals 10 may measure the wireless quality of, from among neighbor cells, only those wireless cells that are registered in the neighbor cell list and then report to wireless base station 30. In the following explanation, among neighbor cells, the wireless cells that are registered in the neighbor cell list are referred to as "Listed Cells," and wireless cells that are not registered on the neighbor cell list are referred to as "Detected Cells."

An example that uses Equation (1) disclosed in Non-Patent Document 1 is here described as an operation condition for mobile terminals 10 to carry out the operation of reporting measurement information of the wireless quality. In this example, mobile terminals 10 measure, as the wireless quality of a wireless cell, the reception power of a pilot signal transmitted from wireless base station 30 that manages the wireless cell.

[Equation 1]

$$P_s + O_s < P_t + O_t \quad (1)$$

In Equation (1), $P_s$ is the reception power in mobile terminal 10 of a pilot signal transmitted from wireless base station 30 that manages the connection destination wireless cell. $P_t$ is the reception power in mobile terminal 10 of a pilot signal transmitted from wireless base station (neighbor base station) 30 that manages a neighbor cell. $O_s$ and $O_t$ are both offset values of reception power, $O_s$ acting upon the reception power of a pilot signal transmitted from wireless base station 30 that manages the wireless cell of the connection destination, and $O_t$ acting upon reception of a pilot signal transmitted from neighbor base station 30. Different values of $O_t$ can be set for each neighbor cell.

When the operating condition of Equation (1) is set, wireless base station 30 communicates the operating condition of Equation (1) to mobile terminals 10 that are connected to the wireless cell that it manages.

Taking as a trigger the satisfaction of the operating condition of Equation (1) by the reception power of pilot signals transmitted from each of wireless base station 30 that manages the wireless cell of the connection destination and those neighbor base stations 30 that manage Listed Cells that are registered in the neighbor cell list, from among neighbor base stations 30, mobile terminals 10 report to wireless base stations 30 the reception power of pilot signals transmitted from neighbor base stations 30 that manage Listed Cells as the measurement information of wireless quality.

In mobile terminals 10, satisfying of the operating condition of Equation (1) is the trigger for reporting measurement information of wireless quality to wireless base station 30, and Equation (1) is therefore sometimes referred to as the "trigger condition" in the following explanation. Equation (1) may further be rewritten as Equation (2) and parameter $Th_{Ho}$ may be referred to as the threshold value for determining handover (handover threshold value). This is because Equation (1) is used as the trigger condition for reporting from mobile terminal 10 to wireless base station 30 that the wireless quality of the wireless cell that is the connection destination has deteriorated when judging whether to execute handover.

[Equation 2]

$$\begin{cases} P_t - P_s > Th_{HO} \\ Th_{HO} = O_s - O_t \end{cases} \quad (2)$$

When the measurement information of wireless quality of the connection destination wireless cell and the Listed Cells satisfies the above-described operating condition, mobile terminals 10 report the measurement information of the wireless quality of these Listed Cells to wireless base station 30.

Wireless base station 30 normally determines the wireless cell of the handover destination from among the Listed Cells for which reports have been received from mobile terminals 10. As a result, mobile terminal 10 is normally not capable of handover to a Detected Cell that is not registered in the neighbor cell list.

Accordingly, when a wireless cell has been omitted from registration in the neighbor cell list, the concern arises that an abnormal disconnection may occur in the middle of communication without the ability to implement handover to an appropriate wireless cell or that wireless quality may deteriorate because handover was implemented to an inappropriate wireless cell. As a result, the generation of a neighbor cell list having no registration omissions is crucial for maintaining good wireless quality.

On the other hand, in order to limit the load on lines required for reporting neighbor cell lists as well as the load on mobile terminals 10 required for the measurement and communication of wireless quality, an upper limit ($L_{Max}$) is normally placed on the number of wireless cells that are registered in a neighbor cell list. Accordingly, priority must be given to the registration of wireless cells having a high potential of contributing to the improvement of wireless quality in order that such wireless cells be registered in a neighbor cell list.

However, setting a neighbor cell list typically requires advanced technology, and the updating (optimization) of a neighbor cell list is normally carried out based on, for example, the results of a traveling (running) test in the service area of a wireless communication system. However, in recent years, neighbor cell list optimization systems are being investigated that autonomously update neighbor cell lists during operation of a wireless communication system.

FIG. 2 shows an example of the configuration of a wireless communication system that is provided with a neighbor cell list optimization system.

The wireless communication system shown in FIG. 2 includes: mobile terminals 10, wireless base stations 30, mobile communication core network 50, network managing system 90, and neighbor cell list optimization system 95. In FIG. 2, constructions that are the same as FIG. 1 are given the same reference numbers and redundant explanation is here omitted.

Neighbor cell list optimization system 95 is connected to network managing system 90 by way of wired link 82 and carries out updating of the neighbor cell lists of wireless cells 35 that are set to wireless base stations 30.

Non-Patent Document 2 discloses a neighbor cell list update method realized by a neighbor cell list optimization system.

FIG. 3 is a view for describing the updating method of the neighbor cell list described in Non-Patent Document 2. In Non-Patent Document 2, as the wireless quality of a wireless cell, a mobile terminal measures the reception power of a pilot signal that is transmitted from the wireless base station that manages the wireless cell. In addition, a mobile terminal measures both Listed Cells and Detected Cells as neighbor cells, and when the reception power of the pilot signal transmitted from the wireless base station that manages a neighbor cell is at least a threshold value, reports the reception power to the wireless base station as measurement information of the wireless quality of that neighbor cell.

As shown in FIG. 3, in the neighbor cell list update method described in Non-Patent Document 2, the number (a) of trial handovers to Listed Cells that are registered in the neighbor cell list is totalized for each of these Listed Cells. In addition, the report number (n) is totalized for each Detected Cell. The report number (n) is the number of receptions of reports from mobile terminals, in which the report is that the reception power of a pilot signal transmitted from the wireless base station that manages the Detected Cells is equal to or greater than the threshold value. Listed Cells for which the number (a) of trial handovers is no greater than a threshold value ($Th_{Del}$) are deleted from the neighbor cell list, and Detected Cells for which the number of reports (n) is equal to or greater than a threshold value ($Th_{Add}$) are registered in the neighbor cell list in order beginning from wireless cells for which the number of reports (n) is greatest. The neighbor cell list is in this way updated.

LITERATURE OF THE PRIOR ART

Non-Patent Documents

Non-Patent Document 1: 3GPP TS 36.331 v8.4.0, p. 66, (2008).
Non-Patent Document 2: D. Soldani, I. Ore, "Self-optimizing Neighbor Cell List for UTRA FDD Networks Using Detected Set Reporting," pp. 694-698, IEEE VTC 2007.

SUMMARY OF THE INVENTION

Problem to be Solved by the Invention

Nevertheless, the neighbor cell list update method described in Non-Patent Document 2 has the following problems.

Cases occur in which new wireless cells (new cells) appear as neighbor cells during use due to, for example, changes in geographical range due to the construction or removal of a building, the new installation of a wireless base station, or the reactivation of a wireless base station that was temporarily down. In such cases, however, while the time that has elapsed from the appearance of a new cell is short, the number of reports (n) from mobile terminals and the number of trial handovers (a) for the new cell is less than for an already existing wireless cell (existing cell). As a result, the prompt addition of a new cell to a neighbor cell list is problematic.

In an environment in which, for example, measurement information for existing cells that surpasses the upper limit of the number of wireless cells that can be registered in the neighbor cell list has been reported from mobile terminals, lowering the threshold value ($Th_{Add}$) to promptly add a new cell as described in Non-Patent Document 2, can be considered. However, in this case, the upper limit on the number of wireless cells that can be registered in the neighbor cell list, makes it difficult to add a new cell because no room exists for registering a new cell.

Alternatively, an approach can be considered of shortening the totalizing interval of the number of reports (n) and the number of trial handovers for existing cells such that extreme differences do not occur between existing cells and new cells in the totalized values of the number of reports (n) and the number of trial handovers (a). In this case, however, the reliability of the totalized values decreases due to the insufficiency of the sampling numbers, and this leads to the different problem of causing a decrease in the reliability of the neighbor cell list with, for example, important existing cells being deleted and unnecessary existing cells being added.

It is therefore an object of the present invention to provide a wireless communication system, a neighbor cell list optimization system, a base station, and a neighbor cell list update method that solve the above-described problems.

Means for Solving the Problem

The wireless communication system of the present invention is a wireless communication system that is provided with mobile terminals and base stations that manage cells to which the mobile terminals are connected, and that includes:

a new cell detection unit that detects, from among neighbor cells that are adjacent to cells to which the mobile terminals are connected, new cells that have newly started or whose operation has resumed or whose geographical range has changed; and a neighbor cell list generation unit that preferentially registers, in neighbor cell lists in which are registered neighbor cells that are candidates for handover destinations of the mobile terminals, new cells that have been detected by the new cell detection unit.

The neighbor cell list optimization system of the present invention is a neighbor cell list optimization system that updates neighbor cell lists in which are registered neighbor cells that are candidates for handover destinations of mobile terminals that are connected to cells managed by base stations, the neighbor cell list optimization system including:

a new cell detection unit that detects from among neighbor cells that are adjacent to cells to which the mobile terminals are connected, new cells that have newly started or whose operation has resumed or whose geographical range has changed; and a neighbor cell list generation unit that preferentially registers in the neighbor cell lists new cells that have been detected by the new cell detection unit.

The base station of the present invention is a base station that manages a cell to which a mobile terminal is connected and includes:

a new cell detection unit that detects, from among neighbor cells that are adjacent to the cell to which the mobile terminal is connected, new cells that have newly started or whose operation has resumed or whose geographical range has changed; and a neighbor cell list generation unit that preferentially registers, in a neighbor cell list in which are registered neighbor cells that are candidates for handover destinations of the mobile terminal, new cells that have been detected by the new cell detection unit.

The first neighbor cell list update method of the present invention is a neighbor cell list update method realized by a neighbor cell list optimization system that updates neighbor cell lists in which are registered neighbor cells that are candidates for handover destinations of mobile terminals that are connected to cells managed by base stations; the first neighbor cell list update method including:

a detection step of detecting, from among neighbor cells that are adjacent to cells to which the mobile terminals are connected, new cells that have newly started or whose operation has resumed or whose geographical range has changed; and a registration step of preferentially registering new cells that have been detected to the neighbor cell lists.

The second neighbor cell list update method of the present invention is a neighbor cell list update method realized by a base station that manages cells to which a mobile terminal is connected; the second neighbor cell list update method including:

a detection step of detecting, from among neighbor cells that are adjacent to the cell to which the mobile terminal is connected, new cells that have newly started or whose operation has resumed or whose geographical range has changed; and a registration step of preferentially registering the new cells that have been detected to a neighbor cell list in which are registered neighbor cells that are candidates as the handover destination of the mobile terminal.

Effect of the Invention

According to the present invention, new cells are detected in advance from among neighbor cells that are adjacent to the cell to which a mobile terminal is connected and if new cells are detected, these new cells that have been detected are preferentially registered to a neighbor cell list.

Accordingly, the effect is obtained that, even when the passage of time from the appearance of a new cell is short, this new cell can be promptly registered to the neighbor cell list.

BRIEF DESCRIPTION OF THE DRAWINGS

FIG. 11 shows an example of the neighbor cell management table that is stored in the measurement information storage unit of the second exemplary embodiment of the present invention.

BEST MODE FOR CARRYING OUT THE INVENTION

Embodiments for implementing the present invention are next described with reference to the accompanying drawings. In the following description, the neighbor cell list optimization system of the present invention is incorporated as neighbor cell list optimization system 95 in the wireless communication system shown in FIG. 2 and is described as a component that updates the neighbor cell lists of wireless cells 35 that are set in wireless base stations 30. Consequently, constructions that are similar to FIG. 2 in the following drawings are given the same reference numbers and redundant explanation is omitted.

1 First Exemplary Embodiment 1-1 Configuration of First Exemplary Embodiment

Figure 4:
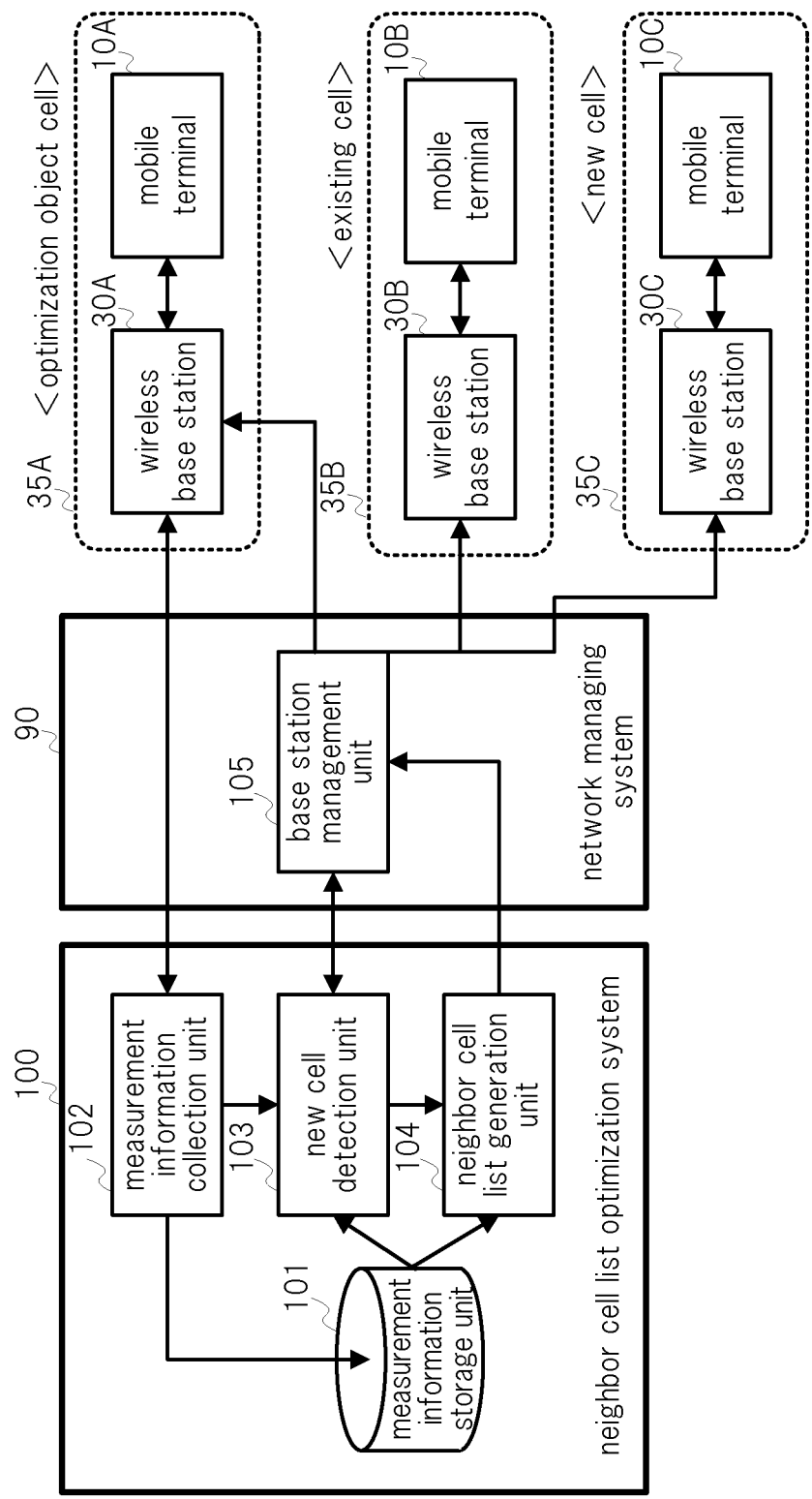
FIG. 4 shows an example of the configuration of a wireless communication system that is provided with the neighbor cell list optimization system of the first exemplary embodiment of the present invention.

FIG. 4 shows an example of the configuration of a wireless communication system that is provided with the neighbor cell list optimization system of the first exemplary embodiment of the present invention. FIG. 4 extracts and shows, from among the constituent elements other than the neighbor cell list optimization system in the wireless communication system of FIG. 2, only mobile terminals 10, wireless base stations 30, and network managing system 90.

As shown in FIG. 4, neighbor cell list optimization system 100 of the present exemplary embodiment includes measurement information storage unit 101, measurement information collection unit 102, new cell detection unit 103, and neighbor cell list generation unit 104 and is connected to network managing system 90.

FIG. 4 includes existing cell 35B and new cell 35C as neighbor cells of wireless cell 35A that is the object of optimization (update) (the optimization object cell) of the neighbor cell list. Here, optimization object cell 35A is managed by wireless base station 30A, and mobile terminal 10A is connected. In addition, existing cell 35B is managed by wireless base station 30B, and mobile terminal 10B is connected. Further, new cell 35C is managed by wireless base station 30C, and mobile terminal 10C is connected. In the following explanation, a wireless base station that is not specified among wireless base stations 30A-30C will be referred to as wireless base station 30, and a mobile terminal that is not specified among mobile terminals 10A-10C will be referred to as mobile terminal 10.

Mobile terminal 10A measures the wireless quality of optimization object cell 35A and the wireless quality of the neighbor cells (existing cell 35B and new cell 35C), and when measurement information of the wireless quality of optimization object cell 35A and the neighbor cells satisfy a predetermined operating condition, reports the measurement information of the wireless quality of the neighbor cell to wireless base station 30A that manages optimization object cell 35A. The neighbor cells for which mobile terminal 10A measures wireless quality include both Listed Cells and Detected Cells. Specific examples of the wireless quality include the reception power and the signal-to-interference ratio of pilot signals transmitted from wireless base stations 30A, 30B, and 30C.

Measurement information storage unit 101 is an area in which is stored, for example, measurement information of the wireless quality of neighbor cells that was reported to wireless base station 30A from mobile terminal 10A that is connected to optimization object cell 35A.

Measurement information collection unit 102 collects measurement information of the wireless quality of neighbor cells that has been reported to wireless base station 30A from mobile terminal 10A that is connected to optimization object cell 35A and stores the collected measurement information in measurement information storage unit 101. Measurement information collection unit 102 totalizes the number of reports, which is the number of receptions of reports of measurement information for each neighbor cell for which measurement information of wireless quality has been reported from mobile terminal 10A to wireless base station 30A, and stores the totalized number of reports in association with identification information of the neighbor cells in measurement information storage unit 101. The operating conditions by which mobile terminal 10A carries out the reporting operation of reporting measurement information of wireless quality to wireless base station 30A are set in advance in wireless base station 30A, and these operating conditions are communicated in advance from wireless base station 30A to mobile terminal 10A by way of a downlink line.

New cell detection unit 103 acquires from measurement information storage unit 101 the identification information of neighbor cells for which measurement information of wireless quality has been reported to wireless base station 30A from mobile terminal 10A, acquires the operation start times of the neighbor cells from base station management unit 105 of network managing system 90 based on the acquired measurement information, and detects new cells from among the neighbor cells based on the acquired operation start times. At this time, new cell detection unit 103 judges other neighbor cells that were not detected as new cells to be existing cells and stores the cell types of the new cells or existing cells of the neighbor cells in measurement information storage unit 101 in association with the identification information and the numbers of reports of the neighbor cells.

Neighbor cell list generation unit 104 acquires the cell types and the numbers of reports of measurement information for each neighbor cell from measurement information storage unit 101. Neighbor cell list generation unit 104 then determines the neighbor cells to be registered in the neighbor cell list of optimization object cell 35A based on this information, updates the neighbor cell list by registering neighbor cells that were determined, and communicates the neighbor cell list following updating to base station management unit 105 of network managing system 90.

As the initial values of a neighbor cell list, the list may be realized by estimating the distances between wireless base station 30A that manages optimization object cell 35A and other wireless base stations 30B and 30C, extracting wireless base stations 30 in the order of shortest distance, and then registering the wireless cells managed by the extracted wireless base stations 30. Alternatively, the list may be an empty neighbor cell list.

1-2 Operation of First Exemplary Embodiment

Figures 5, 6:
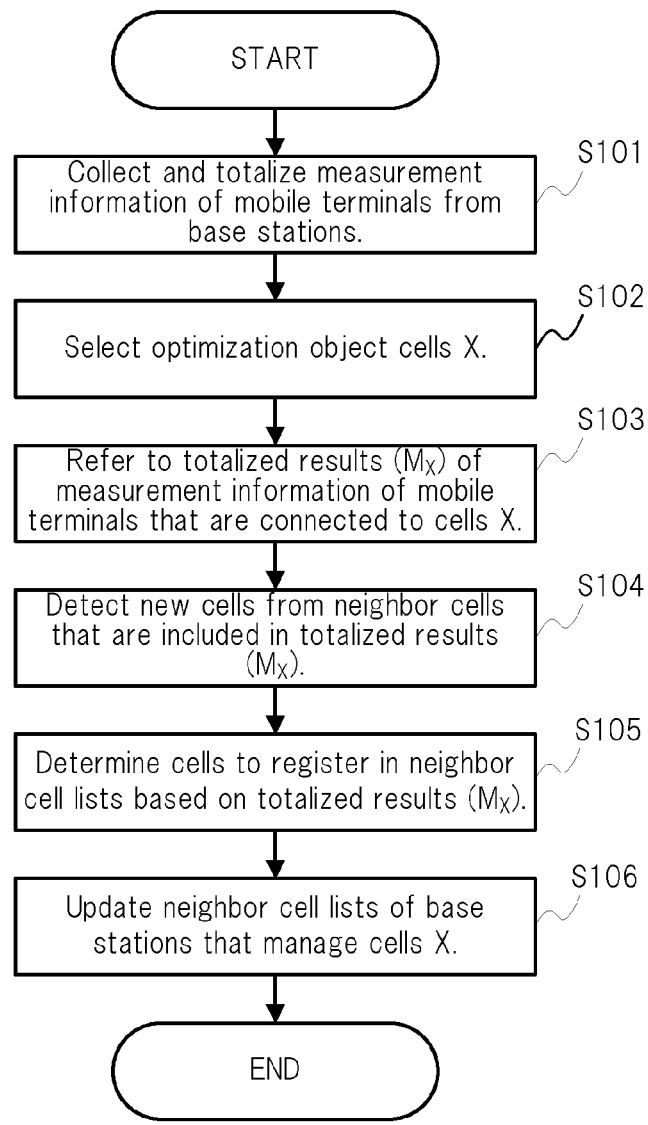
FIG. 5 is a flow chart for describing the operation of the neighbor cell list optimization system of the first exemplary embodiment of the present invention.
FIG. 6 shows an example of the neighbor cell management table that is stored in the measurement information storage unit of the first exemplary embodiment of the present invention.

The operation of neighbor cell list optimization system 100 is next described. FIG. 5 is a flow chart describing the operation of neighbor cell list optimization system 100.

As shown in FIG. 5, measurement information collection unit 102 first sets the operation conditions for causing mobile terminals 10 to carry out the operation of reporting measurement information of the wireless quality of neighbor cells for all wireless base stations 30 that are under the jurisdiction of neighbor cell list optimization system 100. The operation conditions that are set in wireless base stations 30 are reported to mobile terminals 10 by way of downlink lines. Each mobile terminal 10 measures the wireless quality of the wireless cell to which it is connected and that of neighbor cells, and when this measurement information satisfies the above-described operation conditions, reports the measurement information of wireless quality of the neighbor cells to wireless base station 30.

Measurement information collection unit 102 next collects the measurement information of the wireless quality of neighbor cells that mobile terminals 10 reported to wireless base stations 30 in accordance with the above-described operation conditions and stores the collected measurement information in measurement information storage unit 101. Measurement information collection unit 102 further totalizes the number of reports of measurement information for each neighbor cell and stores the totalized results ($M_x$) in measurement information storage unit 101 (Step S101). The above-described operation conditions will be further described at the end of the explanation of this flow chart.

Measurement information collection unit 102 next selects optimization object cells X (Step S102).

In Step S102, for example, all wireless base stations 30 under the jurisdiction of neighbor cell list optimization system 100 are successively selected as optimization object cells. Alternatively, new cells that are managed by newly established wireless base stations 30 and existing cells that are managed by wireless base stations 30 that are within a fixed distance range from the new cell may be selected as the optimization object cells. Alternatively, wireless cells for which the handover failure rate is equal to or greater than a threshold value are detected as wireless cells in which wireless quality has deteriorated and these wireless cells may be selected as optimization object cells.

New cell detection unit 103 next accesses measurement information storage unit 101, refers to the totalized results ($M_x$) of the numbers of reports from mobile terminals 10 that are connected to optimization object cells X that were selected in Step S102 (Step S103), and detects the new cells from among neighbor cells that are contained in the totalized results ($M_x$). At this time, new cell detection unit 103 judges other neighbor cells that were not detected as new cells to be existing cells and stores the cell types of the new cells or existing cells of the neighbor cells in association with the totalized results ($M_x$) of these neighbor cells in measurement information storage unit 101 (Step S104). Details of the new cell detection method are described hereinbelow using FIG. 7.

FIG. 6 shows an example of the management table of the neighbor cells of optimization object cells X that is stored in measurement information storage unit 101 in the present exemplary embodiment.

As shown in FIG. 6, for each neighbor cell for which measurement information of wireless quality was reported to wireless base station 30 from mobile terminals 10 that are connected to optimization object cells X, the number of reports ($n_x$) of measurement information and the cell types (new cell or existing cell) are registered in association in the management table. In addition, the numbers of reports that were totalized in Step S101 are stored in the numbers of reports ($n_x$) and the cell types that were determined in Step S104 are stored in the cell type.

Neighbor cell list generation unit 104 determines the maximum number ($NCL_{max}$) of neighbor cells that are to be registered in the neighbor cell list from among the neighbor cells that are managed in the management table of FIG. 6 (Step S105). $NCL_{max}$ is set to a value within a range that does not surpass the maximum number of wireless cells ($L_{max}$) that can be registered in the neighbor cell list. Details regarding the method of determining the neighbor cells that are registered in the neighbor cell list are described hereinbelow using FIG. 8.

Neighbor cell list generation unit 104 then updates the neighbor cell lists of optimization object cells X by registering the neighbor cells that were determined in Step S105 and communicates the neighbor cell lists that follow updating to base station management unit 105 of network managing system 90 that manages mobile stations 30 that manage optimization object cells X. Base station management unit 105 updates the neighbor cell lists of optimization object cells X to the content that was communicated (Step S106) and terminates the process.

The operation conditions for reporting in Step S101 of FIG. 5 are next described. In the present exemplary embodiment, an example of using Equation (1) described in Non-Patent Document 1 as the operation condition is described.

When the operation condition of Equation (1) is used as a trigger condition in the determination of executing handover, mobile terminals 10 normally measure the wireless quality of only Listed Cells that are registered in the neighbor cell lists.

In contrast, measurement information collection unit 102 in the present exemplary embodiment requests mobile terminals 10 for the measurement of wireless quality of Listed Cells and Detected Cells.

Further, in the present exemplary embodiment, an example is shown in which measurement information collection unit 102 requests all mobile terminals 10 that are connected to optimization object cells to measure wireless quality. However, measurement information collection unit 102 may also request measurement by only a portion of mobile terminals 10 that are connected to optimization object cells, for example, requesting measurement by only mobile terminals 10 that are randomly extracted at a fixed proportion from among mobile terminals 10 that are connected to optimization object cells.

In the present exemplary embodiment, an example is shown in which the same mobile terminals 10 are requested to measure the wireless quality of both Listed Cells and Detected Cells. However, specific mobile terminals may measure only the wireless quality of Listed Cells, for example, only a portion of mobile terminals 10 among mobile terminals 10 that have been requested to measure the wireless quality of Listed Cells may be requested to also measure the wireless quality of Detected Cells.

In the present exemplary embodiment, an example is shown in which the reception power of pilot signals transmitted from wireless base stations 30 is measured as the wireless quality, but another index of wireless quality such as the signal-to-interference ratio may also be measured. Alternatively, at least one from among the signal-to-interference ratio and reception power of pilot signals may be measured as the wireless quality.

Still further, although an example has been shown in the present exemplary embodiment in which the trigger condition of Equation (1) is used as the operation condition, other conditions may be used, such as causing mobile terminals 10 to report when Pt is equal to or greater than a threshold value, or when the signal-to-interference ratio of pilot signals transmitted from neighbor base stations 30 is equal to or greater than a predetermined threshold value.

Figure 7:
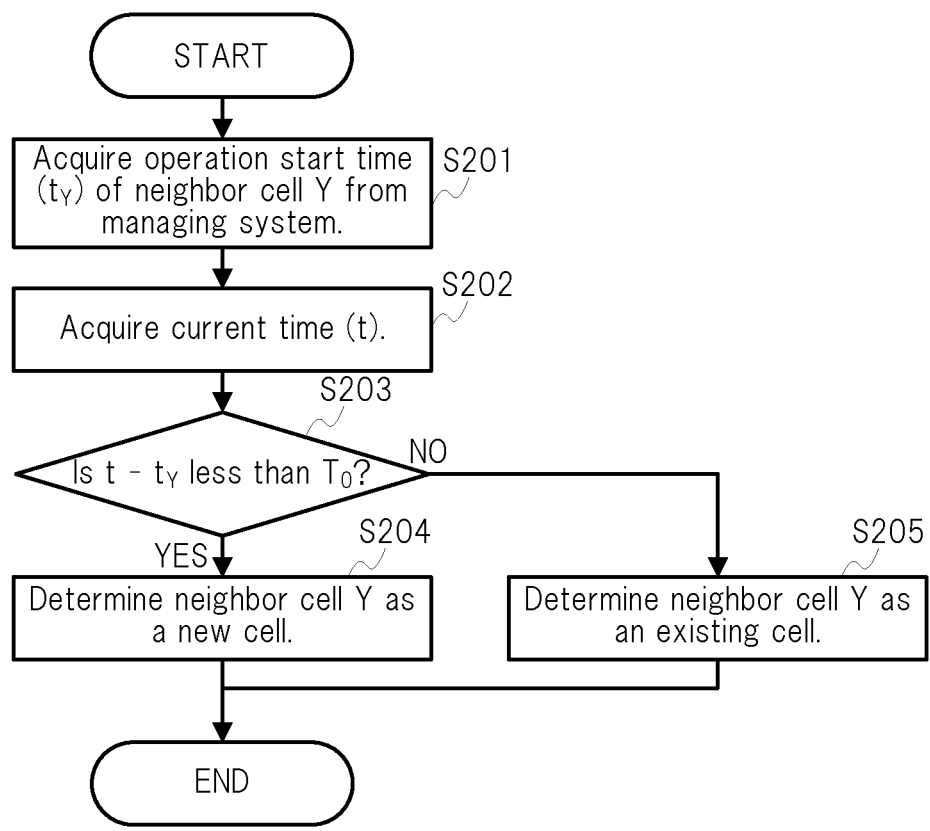
FIG. 7 is a flow chart for describing the new cell detection method by the new cell detection unit of the first exemplary embodiment of the present invention.

The method of detecting new cells by new cell detection unit 103 in Step S104 of FIG. 5 is next described. FIG. 7 is a flow chart for describing the method of detecting new cells.

As shown in FIG. 7, new cell detection unit 103 acquires, for each neighbor cell (Y) for which measurement information of wireless quality has been reported from mobile terminals 10 to wireless base stations 30, the operation start time ($t_Y$) of that neighbor cell from base station management unit 105 of network managing system 90 (Step S201), and further, acquires the current time (t) at the point in time when new cells are detected from an internal clock (not shown) of neighbor cell list optimization system 100 (Step S202), and determines whether the time is within a range of a fixed time interval ($T_0$) from the start of operation by neighbor cell (Y) (Step S203).

When the time is within the range of a fixed time interval ($T_0$) from the start of operation by neighbor cell (Y) in Step S203, new cell detection unit 103 judges that neighbor cell (Y) is a new cell (Step S204), and when the time is not within the fixed time interval, new cell detection unit 103 judges that neighbor cell (Y) is an existing cell (Step S205).

As a method of detecting new cells apart from the method of acquiring the operation start times of neighbor cells from network managing system 90 as described hereinabove, the report of identification information of neighbor cells that have newly started or whose operation has resumed or whose geographical range has changed may be received and the neighbor cells for which communication has been received then determined to be new cells.

When the operation start times of neighbor cells cannot be acquired from network managing system 90, the time of the initial report of measurement information of neighbor cells to wireless base stations 30 from mobile terminals 10 may be substituted for the operation start time and new cells thus detected.

Figure 8:
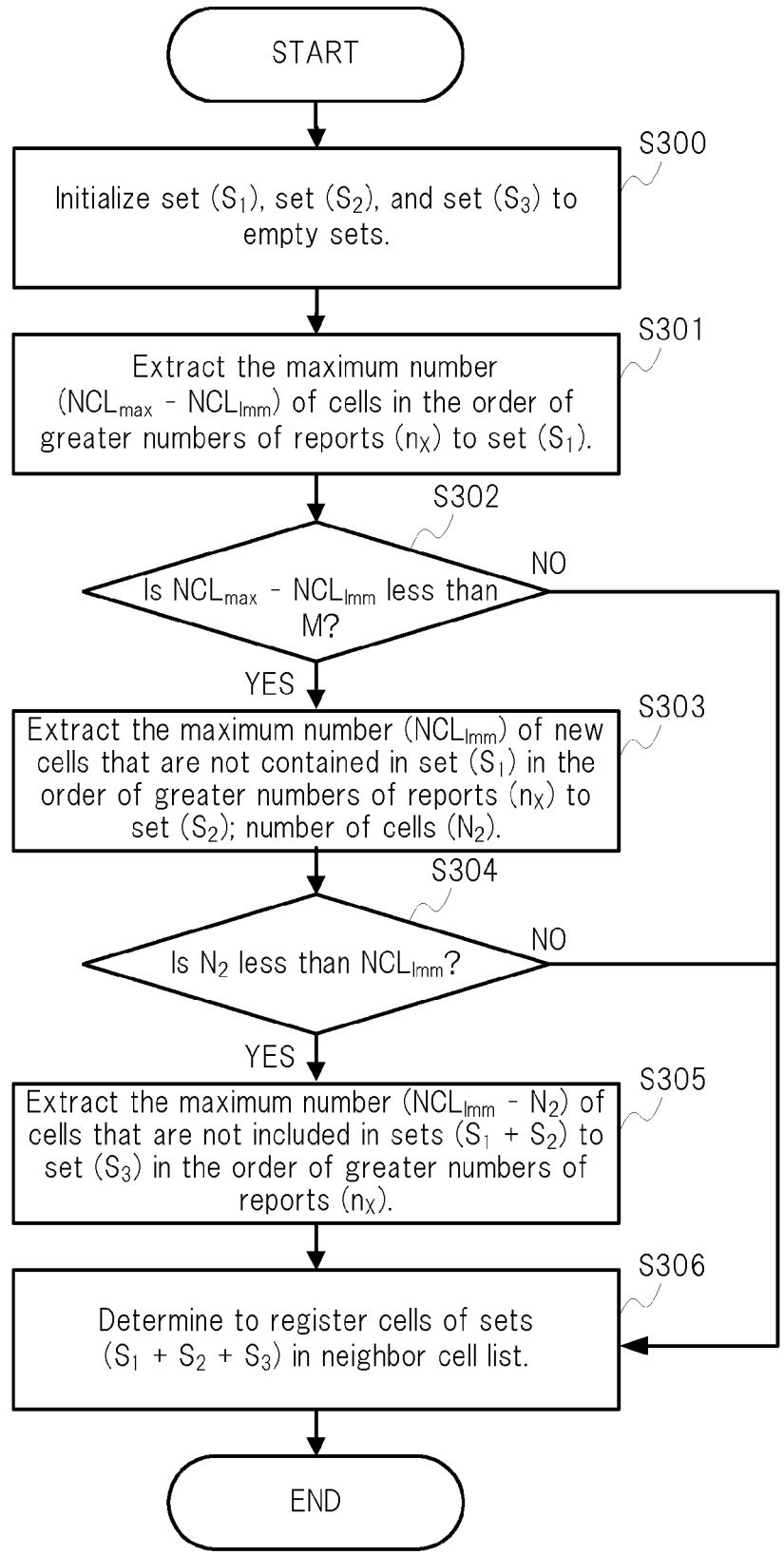
FIG. 8 is a flow chart for describing the neighbor cell determination method by the neighbor cell list generation unit of the first exemplary embodiment of the present invention.

The method of determining neighbor cells by neighbor cell list generation unit 104 in Step S105 of FIG. 5 is next described. FIG. 8 is a flow chart for describing the method of determining neighbor cells.

As shown in FIG. 8, neighbor cell list generation unit 104 first initializes the sets ($S_1$), ($S_2$), and ($S_3$) of neighbor cells to empty sets (Step S300).

Neighbor cell list generation unit 104 next extracts the maximum number ($NCL_{max}$–$NCL_{Imm}$) of neighbor cells in order of greater numbers of reports ($n_X$) from among the neighbor cells that are managed by the management table of FIG. 6 and stores these neighbor cells in a set ($S_1$) (Step S301). Here, $NCL_{Imm}$ is the maximum number of new cells that are preferentially registered and is set to a value within the range of 0 to $NCL_{max}$.

Neighbor cell list generation unit 104 next compares the size of the total number (M) of neighbor cells that are managed by the management table of FIG. 6 and the size of ($NCL_{max}$–$NCL_{Imm}$) (Step S302), and when ($NCL_{max}$–$NCL_{Imm}$) is equal to or greater than the total number (M), determines to register the neighbor cells included in set ($S_1$) in the neighbor cell list (Step S306) and terminates the process.

On the other hand, when ($NCL_{max}$–$NCL_{Imm}$) is less than the total number (M) in Step S302, neighbor cell list generation unit 104 extracts the maximum number ($NCL_{Imm}$) of new cells that are not included in set ($S_1$) in the order of greater numbers of reports ($n_X$) among neighbor cells that are managed by the management table of FIG. 6 and stores these cells in a set ($S_2$) (Step S303).

Neighbor cell list generation unit 104 next compares the size of the number of cells $N_2$ contained in set ($S_2$) with the size of $NCL_{Imm}$ (Step S304), and when the number of cells $N_2$ is equal to or greater than $NCL_{Imm}$, determines to register neighbor cells included in the sets ($S_1$+$S_2$) in the neighbor cell list (Step S306) and terminates the process.

On the other hand, if the number of cells $N_2$ is less than $NCL_{Imm}$ in Step S304, neighbor cell list generation unit 104 extracts the maximum number ($NCL_{Imm}$–$N_2$) of cells not contained in sets ($S_1$+$S_2$) in the order of greater numbers of reports ($n_X$) among neighbor cells managed by the management table of FIG. 6 and stores these cells in a set ($S_3$) (Step S305).

Neighbor cell list generation unit 104 then determines to register neighbor cells contained in the sets ($S_1$+$S_2$+$S_3$) in the neighbor cell list (Step S306), and terminates the process.

Figure 9:
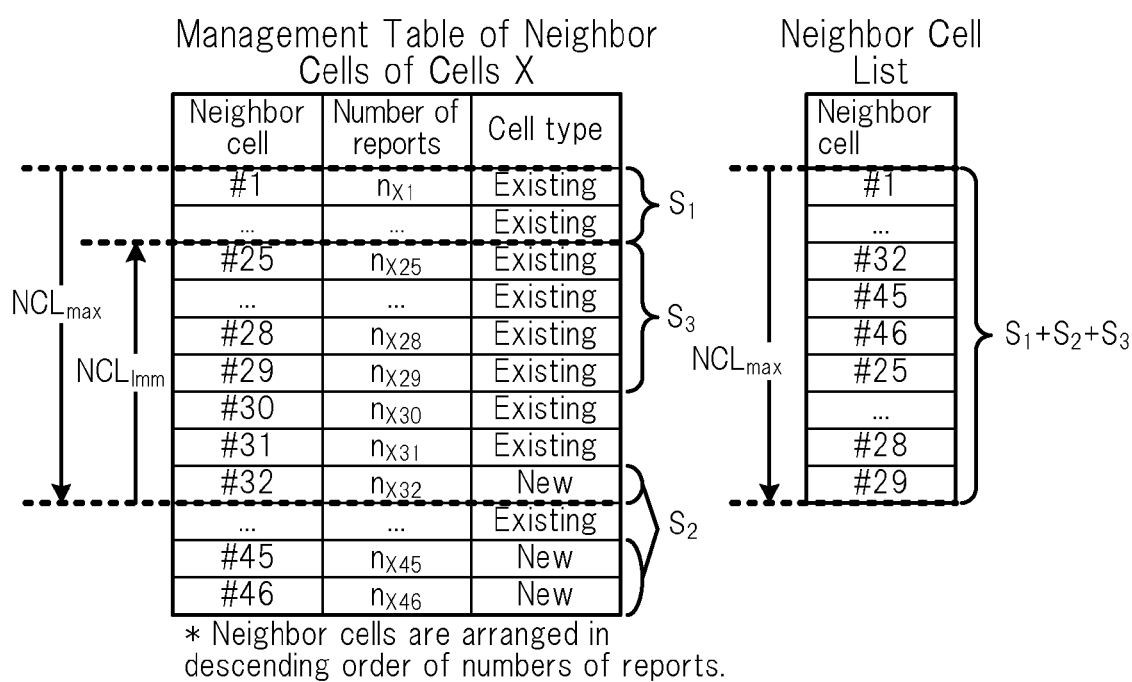
FIG. 9 shows an example of neighbor cells that have been determined by the neighbor cell list generation unit of the first exemplary embodiment of the present invention.

FIG. 9 shows an example of the neighbor cells that were determined according to the method of determining neighbor cells of FIG. 8. In FIG. 9, the neighbor cells of the management table are lined up in descending order of the number of reports ($n_X$) to facilitate understanding.

In the example of FIG. 9, neighbor cells #1~#24 are first stored in ($S_1$), following which neighbor cells #32, #45, and #46 are stored in set ($S_2$), after which neighbor cells #25~#29 are stored in set ($S_3$). The neighbor cells that are included in sets ($S_1$+$S_2$+$S_3$) become the cells that are to be registered in the neighbor cell list.

1-3 Effect of First Exemplary Embodiment

Thus, according to the present exemplary embodiment, neighbor cell list optimization system 100 detects new cells from among neighbor cells for which mobile terminals 10 that are connected to optimization object cells X have reported measurement information of wireless quality to wireless base stations 30, extracts new cells prioritized in the order of greater numbers of reports from mobile terminals 10, and preferentially registers the extracted new cells in the neighbor cell lists of optimization object cells X.

As a result, these new cells can be promptly registered to the neighbor cell lists of optimization object cells X even when there have been few reports from mobile terminals 10 compared to other existing cells due to the short passage of time from the appearance of the new cells.

2 Second Exemplary Embodiment

2-1 Configuration of Second Exemplary Embodiment

Neighbor cell list optimization system 200 of the present exemplary embodiment differs from the first exemplary embodiment in that, in neighbor cell list generation unit 104, the rate of increase over time ($r_X$) of numbers of reports ($n_X$) is calculated for each new cell and new cells are registered in the neighbor cell list prioritized in the order of greater rate of increase over time ($r_X$).

In addition, the overall configuration of the wireless communication system itself that includes neighbor cell list optimization system 200 of the present exemplary embodiment is the same as in the first exemplary embodiment.

2-2 Operation of Second Exemplary Embodiment

Figure 10:
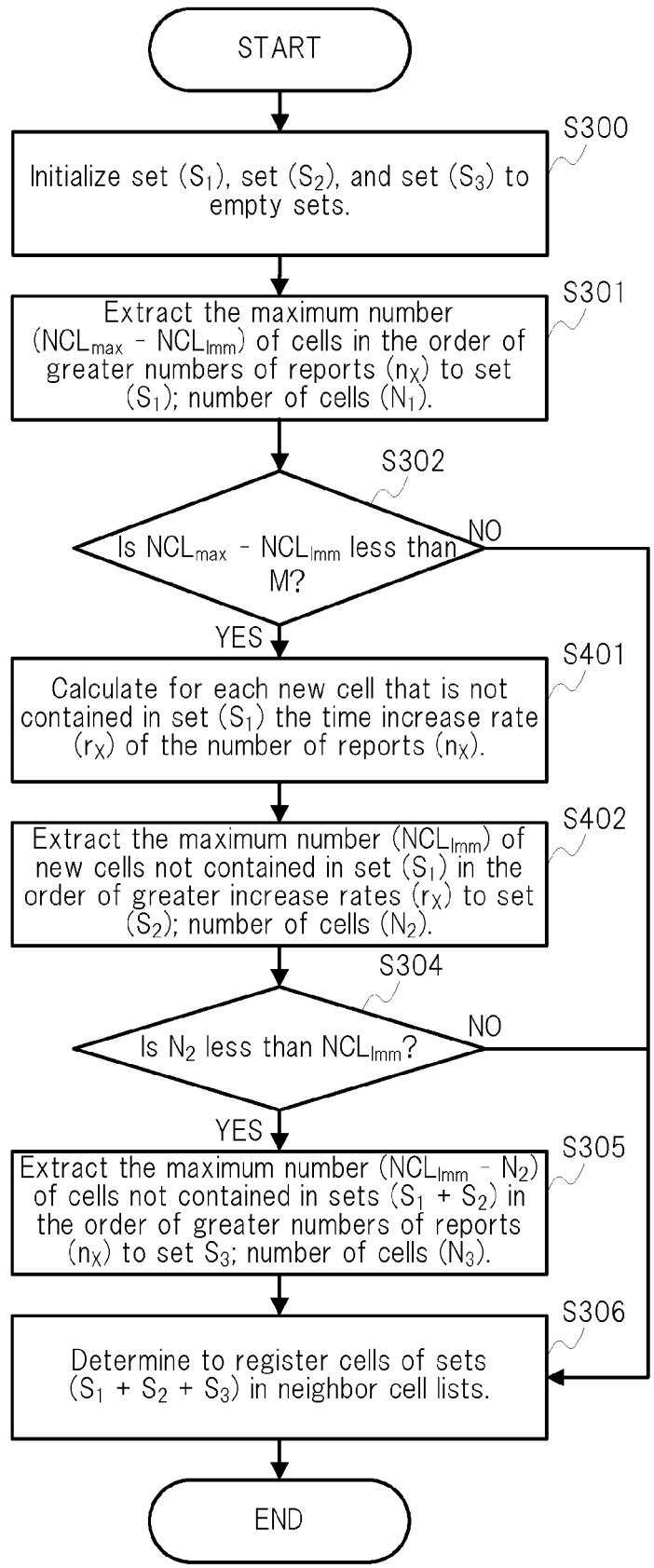
FIG. 10 is a flow chart for describing the neighbor cell determination method by the neighbor cell list generation unit of the second exemplary embodiment of the present invention.

FIG. 10 is a flow chart for explaining the method of determining neighbor cells in neighbor cell list generation unit 104 of neighbor cell list optimization system 200 of the present exemplary embodiment. In FIG. 10, processes that are the same as in FIG. 8 are given the same reference numbers and detailed explanation is here omitted.

As shown in FIG. 10, neighbor cell list generation unit 104 first carries out the processes from Step S300 to Step S302 as in FIG. 8.

If ($NCL_{max} - NCL_{Imm}$) is less than the total number (M) in Step S302, neighbor cell list generation unit 104 calculates the rate of increase over time ($r_{XY}$) of the number of reports ($n_{XY}$) during the interval from operation start time ($t_Y$) of new cell (Y) to the current time (t) for each new cell (Y) that is not included in set ($S_1$) (Step S401).

The rate of increase over time ($r_{XY}$) can be calculated by using, for example, Equation (3).

[Equation 3]

$$r_{XY} = \frac{n_{XY}}{t - t_y} \quad (3)$$

Neighbor cell list generation unit 104 next extracts the maximum number ($NCL_{Imm}$) of new cells that are not included in set ($S_1$) prioritized in order of greater rate of increase over time ($r_X$) and stores these new cells in set ($S_2$) (Step S402).

FIG. 11 shows an example of the management table of the neighbor cells that are optimization object cells X that are stored in measurement information storage unit 101 in the present exemplary embodiment.

As shown in FIG. 11, the management table of the present exemplary embodiment differs from the management table of the first exemplary embodiment shown in FIG. 6 in that the rate of increase over time ($r_X$) of the numbers of reports ($n_{XY}$) for new cells is also recorded.

Neighbor cell list generation unit 104 subsequently carries out the processes from Step S304 to Step S306 similar to FIG. 8.

2-3 Effect of Second Exemplary Embodiment

Thus, according to the present exemplary embodiment, neighbor cell list optimization system 200 extracts new cells prioritized in the order of greater rate of increase over time of the numbers of reports from the operation start time and preferentially registers the extracted new cells in the neighbor cell lists of the optimization object cells X.

When a plurality of new cells having different operation start times are detected in the first exemplary embodiment, new cells in which the passage of time from the operation start time is short and for which the number of reports is low were less likely to be preferentially registered in the neighbor cell lists of optimization object cells X than other new cells.

In contrast, the present exemplary embodiment enables normalization of the numbers of reports by the passage of time from the operation start time and thus enables a more impartial judgment of whether to preferentially register new cells.

3 Third Exemplary Embodiment

3-1 Configuration of Third Exemplary Embodiment

Figure 12:
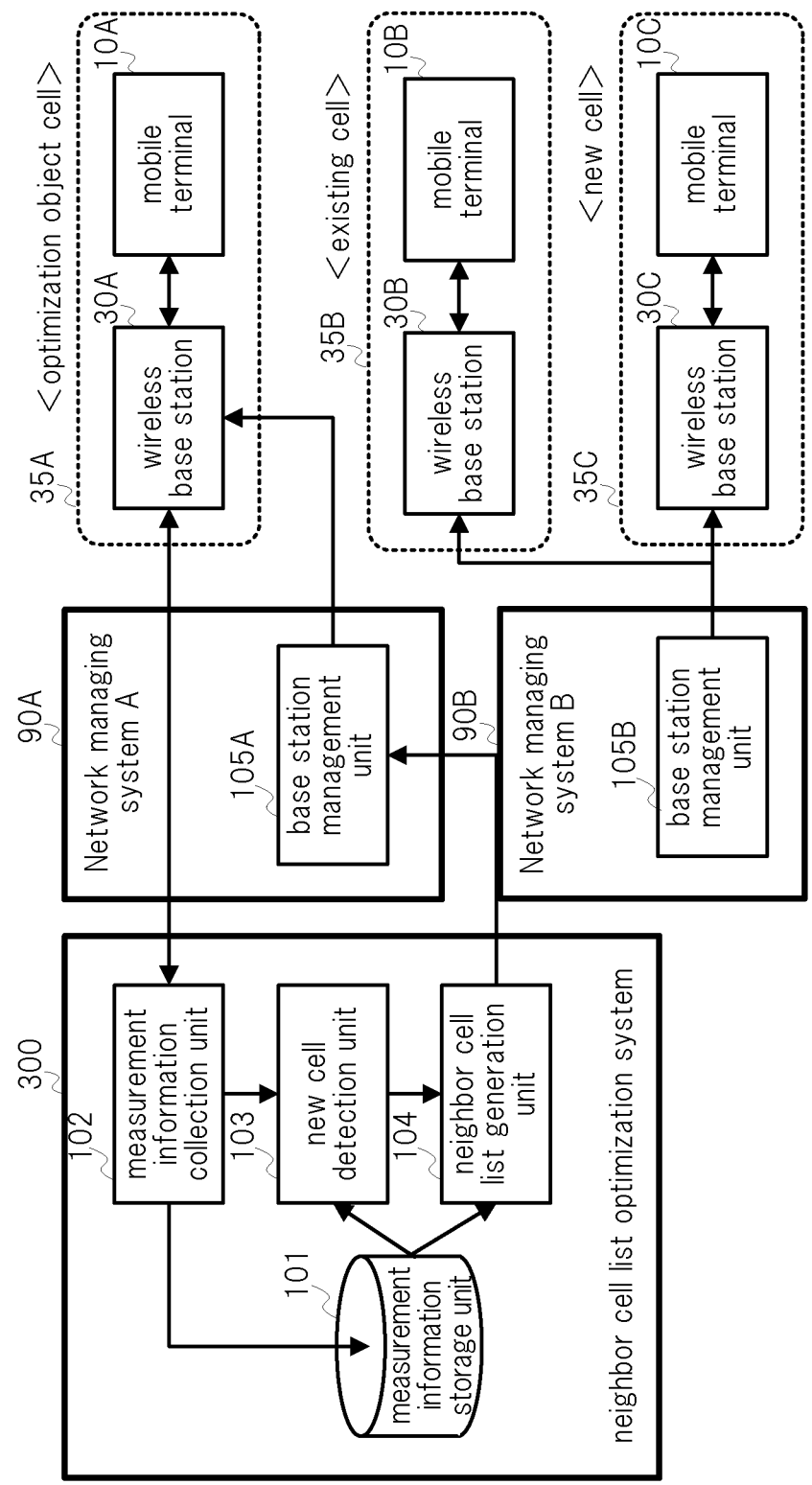
FIG. 12 shows an example of the configuration of a wireless communication system that is provided with the neighbor cell list optimization system of the third exemplary embodiment of the present invention.

FIG. 12 shows an example of the configuration of a wireless communication system that is provided with neighbor cell list optimization system 300 of the third exemplary embodiment of the present invention. In FIG. 12, constituent elements that are the same as in FIG. 4 are given the same reference numbers and redundant explanation is here omitted.

As shown in FIG. 12, the wireless communication system of the present exemplary embodiment differs from the first and second exemplary embodiments in that existing cell 35B and new cell 35C are managed by network managing system 90B that differs from network managing system 90A that manages optimization object cell 35A. In addition, neighbor cell list optimization system 300 is connected to network managing system 90A and is not connected to network managing system 90B.

Neighbor cell list optimization system 300 of the present exemplary embodiment further differs from the first and second exemplary embodiments in that a mechanism is newly provided for totalizing reports from mobile terminals 10 in a shorter interval, and based on the numbers of reports ($n'_X$) that have been totalized in a short interval, new cells can be detected without going by way of network managing system 90. As a result, new cell detection unit 103 of neighbor cell list optimization system 300 need not be provided with an interface for acquiring the operation start times of neighbor cells from network managing system 90A.

3-2 Operation of Third Exemplary Embodiment

The operation of neighbor cell list optimization system 300 of the present exemplary embodiment is next described while referring to the flow chart of FIG. 5.

In the present exemplary embodiment, measurement information collection unit 102 first, in Step S101 of FIG. 5, collects measurement information of neighbor cells that is reported by mobile terminals 10 to wireless base stations 30, totalizes the number of reports of measurement information for each neighbor cell, and stores the totalized results in measurement information storage unit 101. At this time, measurement information collection unit 102 stores both the number of reports ($n_X$) that were totalized in the same totalization interval as in the first and second exemplary embodiments and the number of reports ($n'_X$) that were totalized in a shorter totalization interval as totalized results in measurement information storage unit 101.

Figures 13, 14:
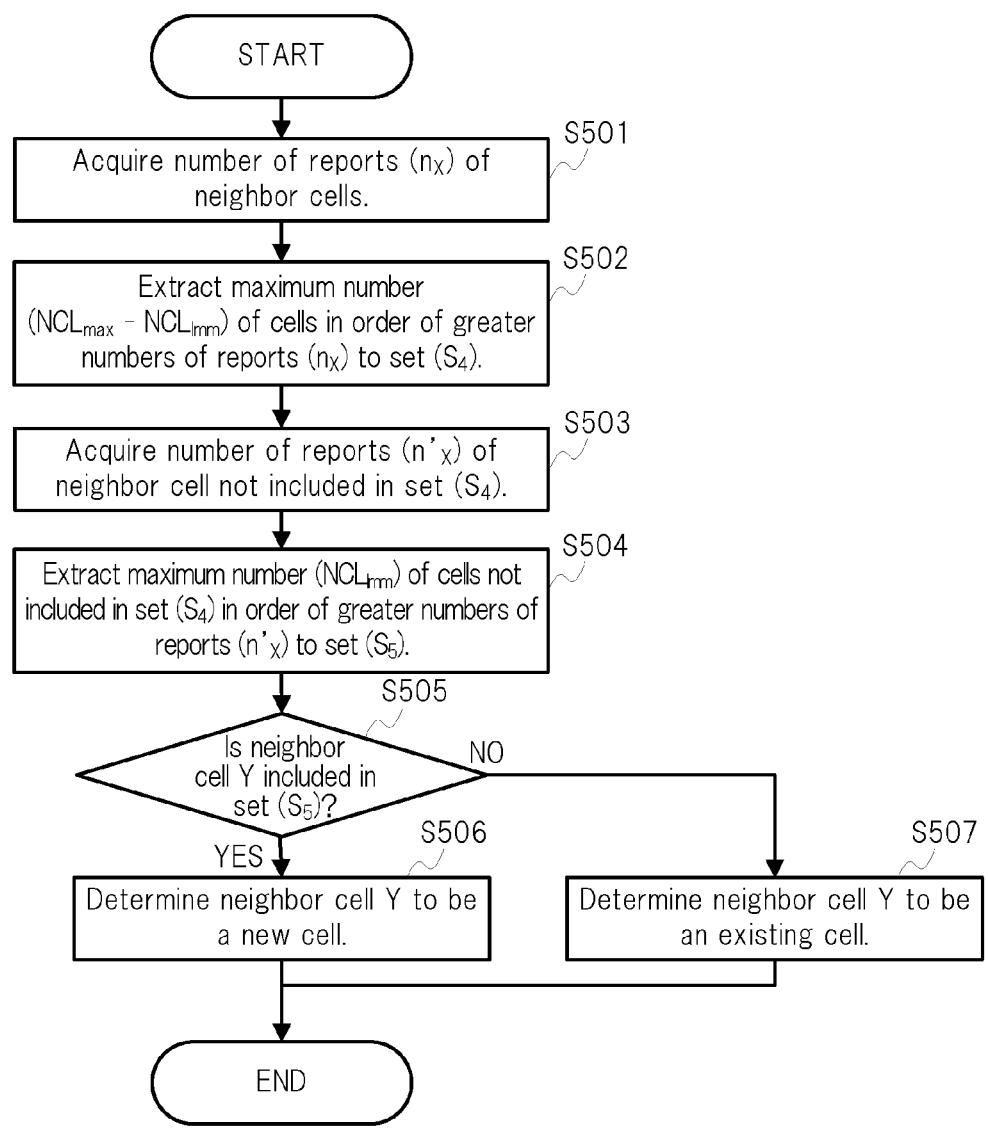
FIG. 13 shows an example of the neighbor cell management table that is stored in the measurement information storage unit of the third exemplary embodiment of the present invention.
FIG. 14 is a flow chart for describing the new cell detection method by the new cell detection unit of the third exemplary embodiment of the present invention.

FIG. 13 shows an example of the management table of neighbor cells that are optimization object cells X that are stored in measurement information storage unit 101 in the present exemplary embodiment.

As shown in FIG. 13, the management table of the present exemplary embodiment differs from the management table of the first exemplary embodiment shown in FIG. 6 in that the numbers of reports ($n'_X$) that are totalized in a short interval are recorded together with the numbers of reports ($n_X$) that are totalized in a long interval for each neighbor cell. These numbers of reports (n'$_x$) are periodically updated such that the most recent totalized results are recorded.

The processes of Steps S102 and S103 of FIG. 5 are next carried out similar to the first and second exemplary embodiments.

Next, in Step S104 of FIG. 5, new cell detection unit 103 detects new cells from neighbor cells that are managed by the management table of FIG. 13 based on the numbers of reports (n'$_x$) that were totalized in a short interval.

FIG. 14 is a flow chart for describing the method of detecting new cells by new cell detection unit 103 of neighbor cell list optimization system 300 of the present exemplary embodiment.

As shown in FIG. 14, new cell detection unit 103 first acquires the number of reports (n$_x$) for each neighbor cell from the management table of FIG. 13 that is stored in measurement information storage unit 101 (Step S501), extracts the maximum number (NCL$_{max}$–NCL$_{Imm}$) of neighbor cells prioritized in the order of greater numbers of reports (n$_x$), and stores these neighbor cells in set (S$_4$) (Step S502).

New cell detection unit 103 next acquires the numbers of reports (n'$_x$) of the short interval of neighbor cells that are not included in set (S$_4$) among neighbor cells that are managed by the management table of FIG. 13 (Step S503), extracts the maximum number (NCL$_{Imm}$) of neighbor cells prioritized in the order of greater numbers of reports (n'$_x$), and stores the neighbor cells in set (S$_5$) (Step S504).

New cell detection unit 103 next determines, for each neighbor cell that is managed by the management table of FIG. 13, whether the neighbor cell is included in set (S$_5$) (Step S505).

Upon determining in Step S505 that a neighbor cell is included in set (S$_5$), new cell detection unit 103 judges the neighbor cell to be a new cell (Step S506), but otherwise judges the neighbor cell to be an existing cell (Step S507).

Apart from the method described hereinabove, the method of detecting new cells may also be another method in which neighbor cells, for which the numbers of reports (n'$_x$) of a short interval are equal to or greater than a fixed number, are determined to be new cells.

For example, the method of detecting new cells may be a method in which neighbor cells that are included in a neighbor cell list during operation are stored in set (S$_4$), of the neighbor cells that are managed by the management table of FIG. 13, neighbor cells for which the numbers of reports (n'$_x$) are greater than the minimum value of neighbor cells that are included in set (S$_4$) are stored in set (S$_5$), and neighbor cells that are included in set (S$_5$) are determined to be new cells and the other neighbor cells are determined to be existing cells.

Next, in Step S105 of FIG. 5, neighbor cell list generation unit 104 determines to preferentially register in the neighbor cell list new cells that have been detected, as in the first or second exemplary embodiment. Alternatively, new cells may also be preferentially registered in the order of new cells for which the number of reports (n'$_x$) that have been totalized in a short interval are greater.

The process of Step S106 of FIG. 5 is next carried out as in the first and second exemplary embodiment.

3-3 Effect of Third Exemplary Embodiment

Thus, according to the present exemplary embodiment, neighbor cell list optimization system 300 is newly provided with a mechanism that totalizes reports from mobile terminals in a short interval, and based on the numbers of reports (n'$_x$) that are totalized in a short interval, detects new cells without going by way of network managing system 90.

When neighbor cells that are managed by network managing system 90 that is not connected to neighbor cell list optimization system 300 are reported from mobile terminals 10 that are connected to optimization object cells in the first and second exemplary embodiments, new cells could not be detected from the reported neighbor cells.

In contrast, according to the present exemplary embodiment, new cells are detected based on the numbers of reports of measurement information from mobile terminals 10 without going by way of network managing system 90, whereby new cells can be detected even in such cases.

4 Other Exemplary Embodiments

Although the present invention has been described with reference to exemplary embodiments hereinabove, the present invention is not limited to the above-described exemplary embodiments. The configuration and details of the present invention are open to various modifications within the scope of the present invention that will be clear to one of ordinary skill in the art.

Figure 1:
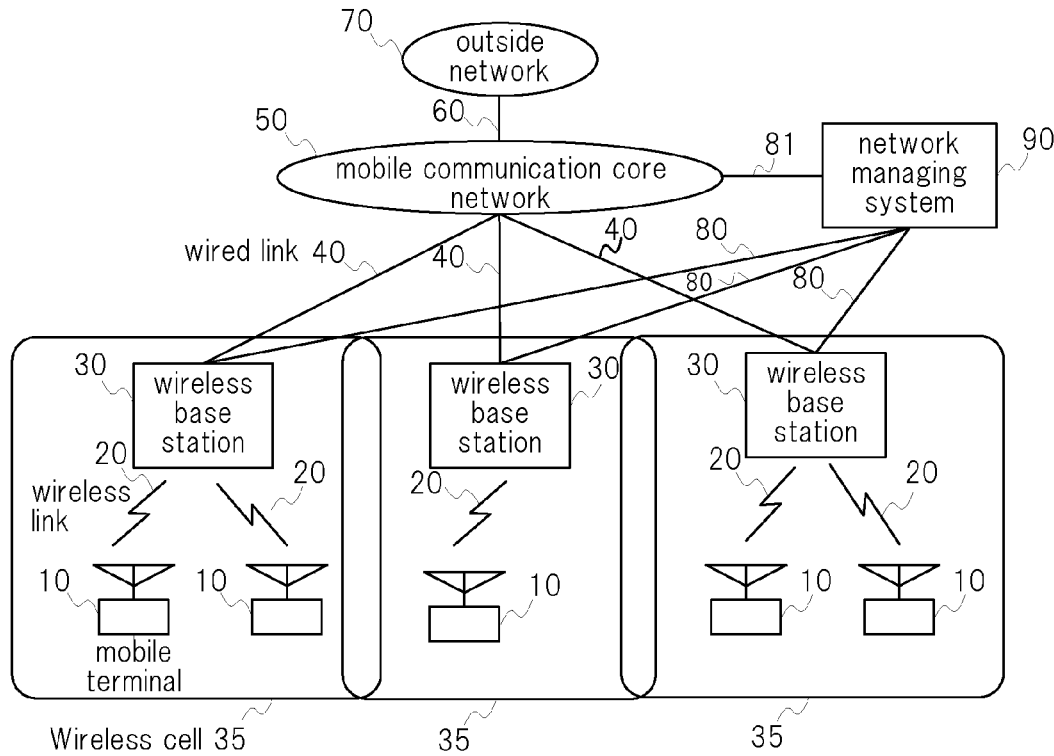
FIG. 1 shows an example of the configuration of a typical wireless communication system.
Figure 2:
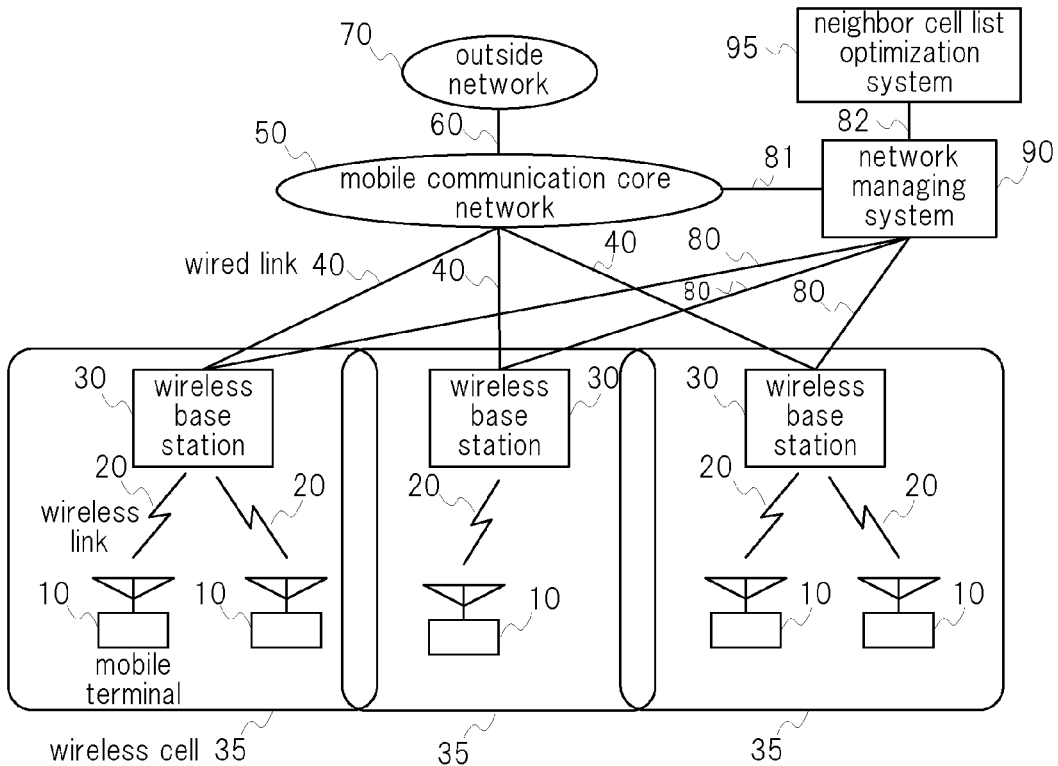
FIG. 2 shows an example of the configuration of a wireless communication system that is provided with a neighbor cell list optimization system.
Figure 3:
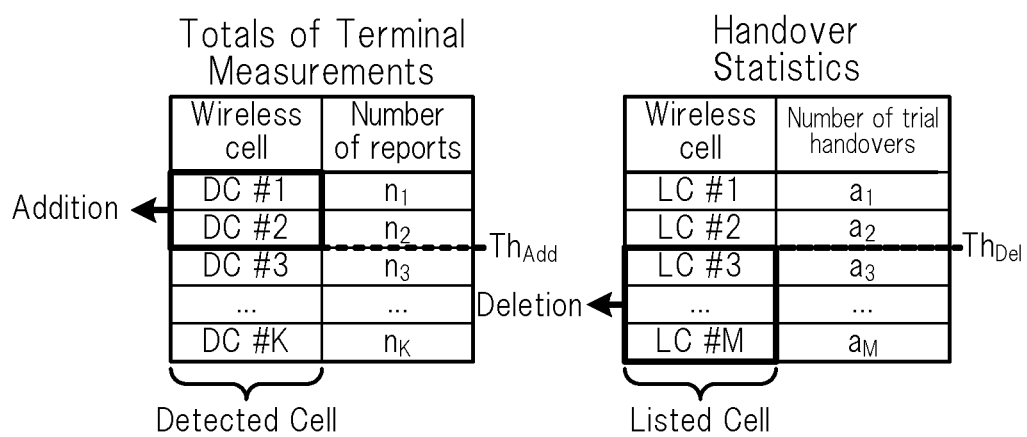
FIG. 3 is a view for describing the neighbor cell list update method that is described in Non-Patent Document 2.

For example, the present invention is not limited to the wireless communication system shown in FIG. 2 and can be applied to a wireless communication system that is provided with a wireless base station control apparatus between mobile communication core network 50 and wireless base stations 30 or to a wireless communication system in which the functions of the neighbor cell list optimization system are incorporated within a wireless base station control apparatus, wireless base stations 30, or network managing system 90. The present invention can also be applied to a case in which a wireless base station managing apparatus is provided between a neighbor cell list optimization system and wireless base stations 30.

In addition, in the above-described first to third exemplary embodiments, examples were described in which a neighbor cell list optimization system managed the totalized results of measurement information of wireless quality that was measured by mobile terminals 10, but these totalized results may also be managed within a wireless base station control apparatus, wireless base stations 30, or network managing system 90. In a case in which functions equivalent to the measurement functions of wireless quality provided to mobile terminals 10 are provided to wireless base stations 30, wireless base stations 30 may also carry out measurement of wireless quality.

In the above-described first to third exemplary embodiments, examples were described in which a wireless communication system is provided with a neighbor cell list optimization system apart from wireless base stations 30 and the neighbor cell list optimization system updates neighbor cell lists that are set in wireless base stations 30, but the present invention is not limited to this form, and wireless base stations 30 can also update neighbor cell lists that are set in their own stations. The measurement information is information that can be collected or stored by wireless base stations 30. As a result, wireless base stations 30 can detect new cells based on this measurement information, preferentially register new cells in neighbor cell lists that are set in their own stations, and update neighbor cell lists.

All or a portion of the above-described exemplary embodiments can be described as shown in the following supplementary notes but is not limited to the following additional supplementary notes.

Supplementary Note 1

A wireless communication system provided with mobile terminals and base stations that manage cells to which the mobile terminals are connected, comprising:

a new cell detection unit that detects, from among neighbor cells that are adjacent to cells to which the mobile terminal are connected, new cells that have newly started or whose operation has resumed or whose geographical range has changed; and a neighbor cell list generation unit that preferentially registers new cells that have been detected by the new cell detection unit in neighbor cell lists in which are registered neighbor cells that are candidates for handover destinations of the mobile terminals.

Supplementary Note 2

The wireless communication system as set forth in supplementary note 1, further comprising a network managing system that manages the operation state of cells, wherein the new cell detection unit acquires information of new cells from the network managing system.

Supplementary Note 3

The wireless communication system as set forth in supplementary note 1, wherein:

said mobile terminals measure wireless quality of cells to which their own terminals are connected and the neighbor cells, and when the measurement information of wireless quality of the cell to which their own terminals are connected and the neighbor cells meets predetermined conditions, report the measurement information of wireless quality of the neighbor cells to the base stations; and the new cell detection unit detects the new cells based on the numbers of reports of measurement information of wireless quality for each of the neighbor cells that were reported from the mobile terminals.

Supplementary Note 4

The wireless communication system as set forth in supplementary note 3, wherein:

when new cells are detected that have not yet been registered in the neighbor cell lists by the new cell detection unit, the neighbor cell list generation unit preferentially registers the new cells in the neighbor cell lists in the order of greater numbers of reports of measurement information of wireless quality reported from the mobile terminals.

Supplementary Note 5

The wireless communication system as set forth in supplementary note 3, wherein the neighbor cell list generation unit:

when new cells that have not yet been registered in the neighbor cell lists are detected by the new cell detection unit, calculates for each of the new cells the rate of increase over time of the numbers of reports of measurement information of wireless quality that is reported from the mobile terminals; and preferentially registers new cells in the neighbor cell lists in the order of higher rates of increase over time.

Supplementary Note 6

The wireless communication system as set forth in any one of supplementary notes 3 to 5, wherein:

the base stations transmit pilot signals; and as the wireless quality of cells, the mobile terminals measure at least one from among the reception power and signal-to-interference ratio of the pilot signals transmitted from base stations that manage the cells.

Supplementary Note 7

A neighbor cell list optimization system that updates neighbor cell lists in which are registered neighbor cells that are candidates for handover destinations of mobile terminals that are connected to cells managed by base stations, comprising:

a new cell detection unit that detects, from among neighbor cells that are adjacent to the cells to which the mobile terminals are connected, new cells that have newly started or whose operation has resumed or whose geographical range has changed; and a neighbor cell list generation unit that preferentially registers in the neighbor cell lists new cells that were detected by the new cell detection unit.

Supplementary Note 8

The neighbor cell list optimization system as set forth in supplementary note 7, wherein said new cell detection unit acquires information of new cells from a network managing system that manages the operation states of cells.

Supplementary Note 9

The neighbor cell list optimization system as set forth in supplementary note 7, further comprising a measurement information collection unit that, when measurement information of wireless quality of cells to which the mobile terminals are connected and the neighbor cells meet predetermined conditions, collects measurement information of wireless quality of the neighbor cells that is reported to the base stations from the mobile terminals;

wherein the new cell detection unit detects the new cells based on the numbers of reports of measurement information of wireless quality of each neighbor cell that is reported from the mobile terminals.

Supplementary Note 10

The neighbor cell list optimization system as set forth in supplementary note 9, wherein the neighbor cell list generation unit, when new cells that have not yet been registered in the neighbor cell lists are detected by the new cell detection unit, preferentially registers the new cells in the neighbor cell lists in the order of neighbor cells having greater numbers of reports of measurement information of wireless quality reported from the mobile terminals.

Supplementary Note 11

The neighbor cell list optimization system as set forth in supplementary note 9, wherein the neighbor cell list generation unit:

when new cells that have not yet been registered in the neighbor cell lists have been detected by the new cell detection unit, calculates for each new cell the rate of increase over time of the number of reports of measurement information of wireless quality that are reported from the mobile terminals; and preferentially registers new cells in the neighbor cell lists in the order of higher rate of increase over time.

Supplementary Note 12

The neighbor cell list optimization system as set forth in any one of supplementary notes 9 to 11, wherein the measurement information collection unit collects, as measurement information of wireless quality of neighbor cells, at least one from among the reception power and signal-to-interference ratio at the mobile terminals of pilot signals transmitted from base stations that manage the neighbor cells.

Supplementary Note 13

A base station that manages cells to which a mobile terminal is connected, comprising:

a new cell detection unit that detects, from among neighbor cells that are adjacent to the cell to which the mobile terminal is connected, new cells that have newly started or whose operation has resumed or whose geographical range has changed; and a neighbor cell list generation unit that preferentially registers new cells that have been detected by the new cell detection unit in a neighbor cell list in which are registered neighbor cells that are candidates for handover destinations of the mobile terminal.

Supplementary Note 14

The base station as set forth in supplementary note 13, wherein the new cell detection unit acquires information of new cells from a network managing system that manages the operation states of cells.

Supplementary Note 15

The base station as set forth in supplementary note 13, further comprising a measurement information collection unit that, when the measurement information of wireless quality of cells to which the mobile terminal is connected and the measurement information of the neighbor cells satisfy predetermined conditions, collects measurement information of wireless quality of the neighbor cells that is reported to the base station from the mobile terminal;

wherein the new cell detection unit detects the new cells based on the numbers of reports of measurement information of wireless quality for each neighbor cell that is reported from the mobile terminal.

Supplementary Note 16

The base station as set forth in supplementary note 15, wherein the neighbor cell list generation unit, when new cells that have not yet been registered in the neighbor cell list have been detected by the new cell detection unit, preferentially registers the new cells in neighbor cell list in the order of greater numbers of reports of measurement information of wireless quality that is reported from the mobile terminals.

Supplementary Note 17

The base station as set forth in supplementary note 15, wherein the neighbor cell list generation unit:

when new cells that have not yet been registered in the neighbor cell list have been detected by the new cell detection unit, calculates for each of the new cells the rate of increase over time of the numbers of reports of measurement information of wireless quality that is reported from the mobile terminals, and preferentially registers the new cells in neighbor cell list in the order of higher rate of increase over time.

Supplementary Note 18

The base station as set forth in any one of supplementary notes 15 to 17, wherein the measurement information collection unit collects as measurement information of wireless quality of neighbor cells at least one from among reception power and signal-to-interference rate in the mobile terminals of pilot signals transmitted from the base station that manage the neighbor cells.

Supplementary Note 19

A neighbor cell list update method that is realized by a neighbor cell list optimization system that updates neighbor cell lists in which are registered neighbor cells that are candidates for handover destinations of mobile terminals that are connected to cells managed by base stations; comprising:

a detection step of detecting, from among neighbor cells that are adjacent to cells to which the mobile terminals are connected, new cells that have newly started or whose operation has resumed or whose geographical range has changed; and a registration step of preferentially registering the new cells that have been detected in the neighbor cell lists.

Supplementary Note 20

The neighbor cell list update method as set forth in supplementary note 19, wherein, in the detection step, information of new cells is acquired from a network managing system that manages the operation states of cells.

Supplementary Note 21

The neighbor cell list update method as set forth in supplementary note 19, further comprising a collection step of, when measurement information of wireless quality of cells to which the mobile terminals are connected and the measurement information of the neighbor cells satisfy predetermined conditions, collecting measurement information of wireless quality of the neighbor cells that is reported to the base stations from the mobile terminals;

wherein in the detection step, the new cells are detected based on, for each neighbor cell, the number of reports of measurement information of wireless quality that is reported from the mobile terminals.

Supplementary Note 22

The neighbor cell list update method as set forth in supplementary note 21, wherein, in the registration step, when new cells that have not yet been registered in the neighbor cell lists are detected, the new cells are preferentially registered in the neighbor cell lists in the order of greater numbers of reports of measurement information of wireless quality that is reported from the mobile terminals.

Supplementary Note 23

The neighbor cell list update method as set forth in supplementary note 21, further comprising:

a calculation step of, when new cells that have not yet been registered in the neighbor cell lists are detected, calculating for each new cell the rate of increase over time of the numbers of reports of measurement information of wireless quality reported from the mobile terminals;

wherein, in the registration step, the new cells are preferentially registered in the neighbor cell lists in the order of higher rate of increase over time.

Supplementary Note 24

The neighbor cell list update method as set forth in any one of supplementary notes 21 to 23, wherein, in the collection step, at least one from amopng reception power and signal-to-interference ratio in the mobile terminals of pilot signals transmitted from base stations that manage the neighbor cells is collected as the measurement information of wireless quality of neighbor cells.

Supplementary Note 25

A neighbor cell list update method that is realized by base stations that manage cells to which mobile terminals are connected; comprising:

a detection step of detecting, from among neighbor cells that are adjacent to cells to which the mobile terminals are connected, new cells that have newly started or whose operation has resumed or whose geographical range has changed; and a registration step of preferentially registering the new cells that have been detected to neighbor cell lists in which are registered neighbor cells that are candidates for handover destinations of the mobile terminals.

Supplementary Note 26

The neighbor cell list update method as set forth in supplementary note 25, wherein, in the detection step, information of new cells is acquired from a network managing system that manages the operation states of cells.

Supplementary Note 27

The neighbor cell list update method as set forth in supplementary note 25, further comprising:

a collection step of, when measurement information of wireless quality of cells to which the mobile terminals are connected and the measurement information of the neighbor cells satisfy predetermined conditions, collecting measurement information of wireless quality of the neighbor cells that is reported to the base stations from the mobile terminals;

wherein, in the detection step, the new cells are detected based on, for each neighbor cell, the number of reports of measurement information of wireless quality that is reported from the mobile terminals.

Supplementary Note 28

The neighbor cell list update method as set forth in supplementary note 27, wherein, in the registration step, when new cells that have not been registered in the neighbor cell lists are detected, preferentially registering the new cells in the neighbor cell lists in the order of greater numbers of reports of measurement information of wireless quality reported from the mobile terminals.

Supplementary Note 29

The neighbor cell list update method as set forth in supplementary note 27, further comprising a calculation step of, when new cells that have not yet been registered in the neighbor cell lists are detected, calculating for each of the new cells, the rate of increase over time of the numbers of reports of measurement information of wireless quality that is reported from the mobile terminals;

wherein, in the registration step, the new cells are preferentially registered in the neighbor cell lists in the order of higher rate of increase over time.

Supplementary Note 30

The neighbor cell list update method as set forth in any one of supplementary notes 27 to 29, wherein, in the collection step, at least one from among reception power and signal-to-interference ratio in the mobile terminals of pilot signals transmitted from base stations that manage the neighbor cells is collected as the measurement information of wireless quality of neighbor cells.

UTILITY IN INDUSTRY

The present invention can be used in network managing systems in mobile communication networks.

This application claims the benefits of priority based on Japanese Patent Application No. 2010-201013 for which application was submitted on Sep. 8, 2010 and incorporates by citation all of the disclosures of these applications.

What is claimed is:

1. A wireless communication system provided with mobile terminals and base stations that manage cells to which said mobile terminals are connected, comprising:

a new cell detection unit that detects, from among neighbor cells that are adjacent to cells to which said mobile terminals are connected, new cells that have newly started or whose operation has resumed or whose geographical range has changed; and a neighbor cell list generation unit that preferentially registers new cells that have been detected by said new cell detection unit in neighbor cell lists in which are registered neighbor cells that are candidates for handover destinations of said mobile terminals wherein:

said mobile terminals measure wireless quality of cells to which their own terminals are connected and said neighbor cells, and when measurement information of wireless quality of cells to which their own terminals are connected and the neighbor cells satisfies predetermined conditions, report measurement information of wireless quality of the neighbor cells to said base stations;

said new cell detection unit detects said new cells based on the numbers of reports of measurement information of wireless quality that is reported from said mobile terminals for each neighbor cell.

2. The wireless communication system as set forth in claim 1, further comprising:

a network managing system that manages the operation states of cells;

wherein said new cell detection unit acquires information of new cells from said network managing system.

3. The wireless communication system as set forth in claim 1, wherein:

when new cells that have not yet been registered in said neighbor cell lists have been detected by said new cell detection unit, said neighbor cell list generation unit preferentially registers in neighbor cell lists said new cells in the order of greater numbers of reports of measurement information of wireless quality that is reported from said mobile terminals.

4. The wireless communication system as set forth in claim 1, wherein said neighbor cell list generation unit:

when new cells that have not yet been registered in said neighbor cell lists have been detected by said new cell detection unit, calculates for each said new cell the rate of increase over time of the number of reports of measurement information of wireless quality that is reported from said mobile terminals; and preferentially registers said new cells in neighbor cell lists in the order of higher rate of increase over time.

5. The wireless communication system as set forth in claim 1, wherein:

said base stations transmit pilot signals; and said mobile terminals measure, as wireless quality of cells, at least one of reception power and signal-to-interference ratio of pilot signals that are transmitted from base stations that manage the cells.

6. A neighbor cell list optimization system that updates neighbor cell lists in which are registered neighbor cells that are candidates for handover destinations of mobile terminals that are connected to cells managed by base stations, comprising:

a new cell detection unit that detects, from among neighbor cells that are adjacent to cells to which said mobile terminals are connected, new cells that have newly started or whose operation has resumed or whose geographical range has changed; and a neighbor cell list generation unit that preferentially registers in said neighbor cell lists new cells that have been detected by said new cell detection unit wherein:

said mobile terminals measure wireless quality of cells to which their own terminals are connected and said neighbor cells, and when measurement information of wireless quality of cells to which their own terminals are connected and the neighbor cells satisfies predetermined conditions, report measurement information of wireless quality of the neighbor cells to said base stations;

said new cell detection unit detects said new cells based on the numbers of reports of measurement information of wireless quality that is reported from said mobile terminals for each neighbor cell.

7. A base station that manages cells to which a mobile terminal is connected, comprising:

a new cell detection unit that detects, from among neighbor cells that are adjacent to the cell to which said mobile terminal is connected, new cells that have newly started or whose operation has resumed or whose geographical range has changed; and a neighbor cell list generation unit that preferentially registers, in a neighbor cell list in which are registered neighbor cells that are candidates for handover destination of said mobile terminal, new cells that have been detected by said new cell detection unit wherein:

said mobile terminals measure wireless quality of cells to which their own terminals are connected and said neighbor cells, and when measurement information of wireless quality of cells to which their own terminals are connected and the neighbor cells satisfies predetermined conditions, report measurement information of wireless quality of the neighbor cells to said base stations;

said new cell detection unit detects said new cells based on the numbers of reports of measurement information of wireless quality that is reported from said mobile terminals for each neighbor cell.

8. A neighbor cell list update method that is realized by a neighbor cell list optimization system that updates neighbor cell lists in which are registered neighbor cells that are candidates for handover destinations of mobile terminals that are connected to cells managed by base stations, comprising:

a detection step of detecting, from among neighbor cells that are adjacent to cells to which said mobile terminals are connected, new cells that have newly started or whose operation has resumed or whose geographical range has changed; and a registration step of preferentially registering said new cells that have been detected in said neighbor cell lists wherein:

said mobile terminals measure wireless quality of cells to which their own terminals are connected and said neighbor cells, and when measurement information of wireless quality of cells to which their own terminals are connected and the neighbor cells satisfies predetermined conditions, report measurement information of wireless quality of the neighbor cells to said base stations;

the detecting step further comprises detecting said new cells based on the numbers of reports of measurement information of wireless quality that is reported from said mobile terminals for each neighbor cell.

9. A neighbor cell list update method that is realized by a base station that manages cells to which a mobile terminal is connected; comprising:

a detection step of detecting, from among neighbor cells that are adjacent to the cell to which said mobile terminal is connected, new cells that have newly started or whose operation has resumed or whose geographical range has changed; and a registration step of preferentially registering said new cells that have been detected to a neighbor cell list in which are registered neighbor cells that are candidates as the handover destination of said mobile terminal wherein:

said mobile terminals measure wireless quality cells to which their own terminals a connected and said neighbor cells, and when measurement information of wireless quality of cells to which their own terminals are connected and the neighbor cells satisfies predetermined conditions, report measurement information of wireless quality of the neighbor cells to said base stations;

the detecting step further comprises detecting said new cells based on the numbers of reports of measurement information of wireless quality that is reported from said mobile terminals for each neighbor cell.

* * * * *